L. B. SPERRY & A. F. MOHR.
TRACTOR.
APPLICATION FILED OCT. 13, 1913.

1,178,761.

Patented Apr. 11, 1916.
2 SHEETS—SHEET 2.

UNITED STATES PATENT OFFICE.

LEONARD B. SPERRY AND ALBERT F. MOHR, OF MILWAUKEE, WISCONSIN, ASSIGNORS TO INTERNATIONAL HARVESTER CORPORATION, A CORPORATION OF NEW JERSEY.

TRACTOR.

1,178,761.  Specification of Letters Patent.  Patented Apr. 11, 1916.

Application filed October 13, 1913. Serial No. 794,918.

*To all whom it may concern:*

Be it known that we, LEONARD B. SPERRY and ALBERT F. MOHR, citizens of the United States, and residents of Milwaukee, in the county of Milwaukee and State of Wisconsin, have invented certain new and useful Improvements in Tractors, of which the following is a full, clear, and exact specification.
This invention relates to tractors, and more particularly to engine starting equipments therefor.

Although tractors, operated by internal combustion engines, have been used for a considerable length of time, only recently such power internal combustion engines have been started satisfactorily by means not requiring the main force of the operator in turning over the engine. In a great many instances, such internal combustion engines are started by forcing compressed air into the cylinder, or one of the cylinders, of such engines. Where compressed air is used for starting, it is necessary to carry some place on the tractor a reservoir for storing the air. It is necessary also to maintain the pressure in this reservoir at certain values, or at values not below a certain minimum. To maintain desired air pressure, it is necessary to replenish the reservoir at intervals. This may be done in various ways, the most proper being to carry a small compressor unit on the tractor itself. Tractors in themselves are bulky at best, and it is no little problem to properly locate accessories, such as starting equipments, to make them accessible and still protected, without taking up a great deal of space and making the appearance of the tractor more cumbersome than it otherwise might be.

It, therefore, is the object of our invention to equip a tractor with an engine starting system in which the various parts thereof are located so that they are accessible, still protected, and occupy the minimum amount of space. This object is accomplished by providing a tractor having a power internal combustion engine with a starting equipment in which the parts are conveniently and accessibly located, said parts taking up a minimum amount of space on the forward part of the tractor, and being protected wherever necessity demands.

This invention is illustrated on the accompanying sheets of drawings, in which—

Figure 1:
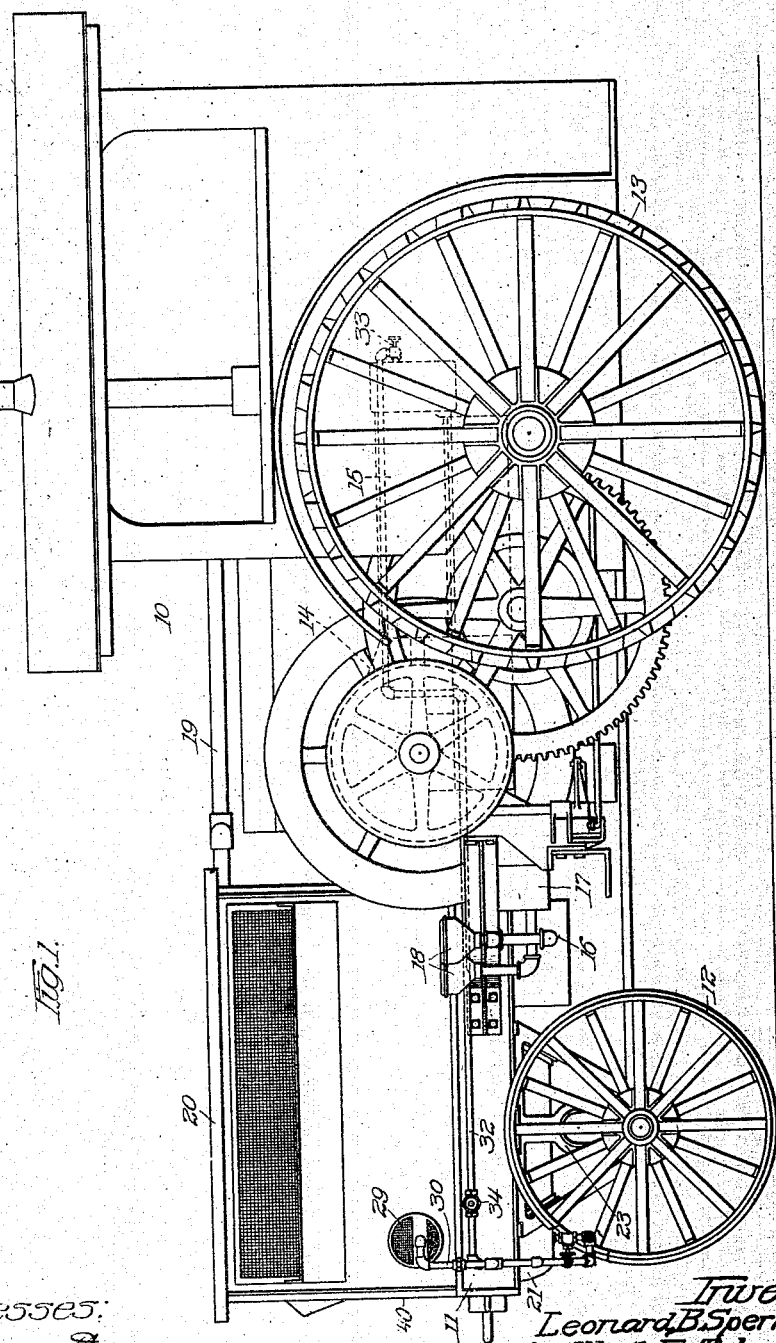
Figure 2:
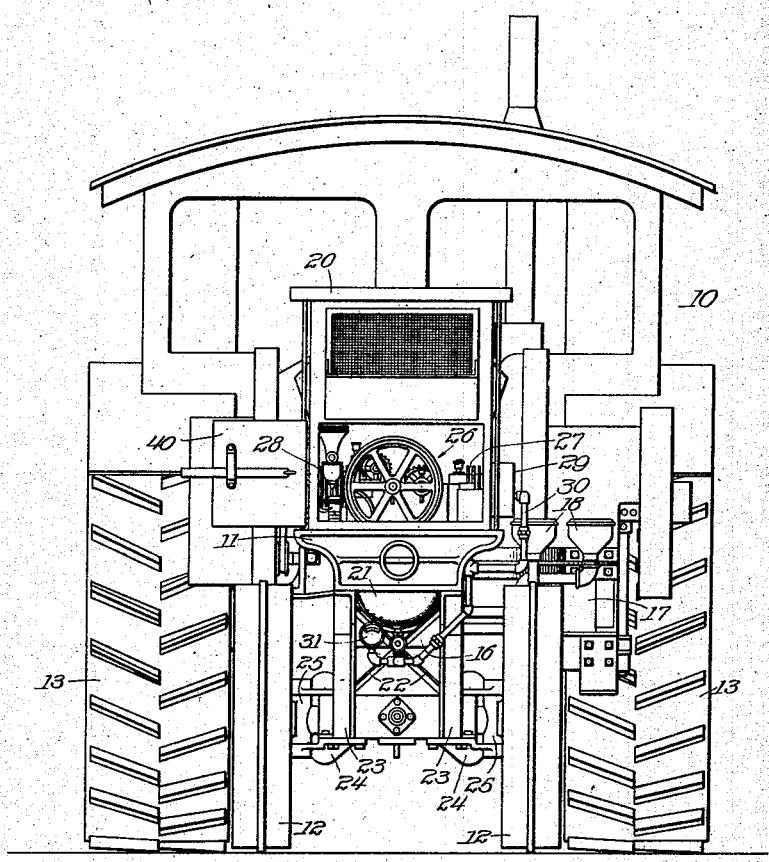

Figure 1 is a side elevation of a tractor equipped with our invention; and Fig. 2 is a front elevation of the same tractor.

The various novel features of our invention will be apparent from the specification and drawings, and will be particularly pointed out in the appended claims.

The tractor 10, in connection with which our invention is herein disclosed, includes a main frame 11 supported by steering wheels 12 and traction wheels 13; the latter being actuated through suitable transmission mechanism by an internal combustion engine 14 having a cylinder, or cylinders, 15, as the case may be. The tractors which are in demand nowadays are the tractors operated by internal combustion engines using kerosene as fuel. For the reason that difficulty sometimes is experienced in starting internal combustion engines on kerosene, such tractors are usually equipped with two fuel containing reservoirs 16 and 17; one for containing gasolene for starting purposes, and the other for kerosene or some other comparatively heavy fuel oil for regular running. These reservoirs may be filled by suitable funnel members 18. This engine is cooled by means of circulating water which, after being heated in the water jackets surrounding the cylinder or cylinders 15, passes through a pipe 19, and is cooled in a radiator 20.

As above stated, difficulty is experienced at times in starting the power engine of the tractor, due to various causes, including extreme weather conditions and the poor grade of fuel oil which may be used. At times it is necessary to make several attempts at starting the engine before a successful explosion may be obtained for the desired purpose. If, under these conditions, it were necessary to crank the engine or turn it over manually, it would prove to be burdensome and, in some cases, almost impossible to start the engine. This is especially true where the power engine of the tractor is of considerable capacity. For this reason up-todate tractors are equipped with automatic means for starting the engine. In this particular tractor the engine is started on compressed air, which is stored in a reservoir 21 supported by cross arm 22 in brackets 23, which are connected to an axle member 24 in which the stub axle 25 of each of the steering wheels 12 is pivotally mounted. This compressed air reservoir is located in the front part of the frame under the radiator 20 and between the steering wheels 12. The reservoir 21 is filled with compressed air by a small compressor unit 26 mounted in a space formed in the front and lower portion of the casing or frame of the radiator 20. This compressor unit 26 includes an air compressor 27 which is driven by a small gasolene engine 28, atmospheric air being drawn into the compressor unit space within the radiator through a sieve 29. The compressed air is forced from the air compressor 27 into the reservoir 21 through a pipe 30, the pressure of the air in the reservoir being indicated by a gage 31. This pipe 30, extending between the compressor and the reservoir, has a branch 32 which leads back to the head end of the cylinder 15, or of one of the cylinders, where said pipe is properly connected so that the compressed air may be forced into said cylinder for starting purposes, the admission of the compressed air into the cylinder 15 being controlled by a hand operated valve 33. Located in the forward end of the pipe 32 is a valve 34, which may be closed while the compressor is in operation and pumping air into the reservoir 21. This valve 34, however, should be kept open when it is desired to start the engine 14 on compressed air. In starting the power engine of the tractor, the compressed air is to be admitted to one of the cylinders on the stroke of its piston corresponding to the power stroke. The valve 33 is maintained open, permitting compressed air to pass into the cylinder at the proper time, until an explosion has occurred in the cylinder or one of the cylinders of the engine and said engine started, whereupon the valve 33 is closed and the engine operates as usual.

By placing the compressor unit in a portion of the radiator frame it is protected from all dust and foreign matter which would prove injurious, and at the same time occupies a minimum amount of space and makes a neat appearance. That part of the radiator in which the compressor unit is mounted is provided with doors 40 (only one being shown), by means of which said unit is accessible at all times. The compressed air reservoir is located conveniently, occupying a minimum amount of space and requiring only a small pipe connection between the compressor and the reservoir.

It is evident that various modifications may be made in our invention as herein particularly shown and described, and it is our intention to cover all such modifications which do not involve a departure from the spirit and scope of our invention as set forth in the appended claims.

What we claim as new is:

1. In a tractor, the combination of a frame, a power engine carried thereby, a radiator for said engine having a casing, an air reservoir, an air compressor mounted in the casing of said radiator, and connections between said compressor, reservoir and engine.

2. In a tractor, the combination of a frame, a power engine carried thereby, a radiator for said engine having a casing and being mounted on the front part of said frame, an air reservoir mounted under said radiator, an air compressor mounted in the casing of said radiator, and connections between said compressor, reservoir and engine.

3. In a tractor, the combination of a power engine adapted to be started automatically, a radiator therefor having a dust proof casing, an air compressor located in the casing of said radiator, and a connection between said compressor and engine.

4. In a tractor, the combination of a power engine adapted to be started automatically, a radiator therefor having a dust proof casing, an air reservoir, an air compressor mounted in the casing of said radiator, and connections between said compressor, reservoir and engine.

5. In a tractor, the combination of a power engine adapted to be started automatically, a radiator for said engine having a chamber therein, an air compressor mounted in said chamber, an air reservoir mounted under said radiator, and connections between said compressor, reservoir and engine.

6. In a tractor, the combination of a power engine adapted to be started automatically, a radiator therefor having a dust proof casing, an air compressor located within the casing of said radiator, and an air reservoir, said compressor, reservoir and engine being interconnected.

In testimony whereof we affix our signatures, in the presence of two witnesses.

LEONARD B. SPERRY.
ALBERT F. MOHR.

Witnesses:
R. F. WEBER,
G. L. WIEDEMANN.